United States Patent
Carpenter, Jr. et al.

(10) Patent No.: US 11,205,915 B2
(45) Date of Patent: Dec. 21, 2021

(54) AUTONOMOUS ADAPTER PASS THROUGH MODE FOR BUCK-BOOST BATTERY CHARGER

(71) Applicant: Renesas Electronics America, Milpitas, CA (US)

(72) Inventors: John H. Carpenter, Jr., Holly Springs, NC (US); Mehul Shah, Cary, NC (US); Michael Jason Houston, Cary, NC (US)

(73) Assignee: Renesas Electronics America, Milpitas, CA (US)

(*) Notice: Subject to any disclaimer, the term of this patent is extended or adjusted under 35 U.S.C. 154(b) by 340 days.

(21) Appl. No.: 16/249,815

(22) Filed: Jan. 16, 2019

(65) Prior Publication Data

US 2019/0222031 A1  Jul. 18, 2019

Related U.S. Application Data

(60) Provisional application No. 62/618,488, filed on Jan. 17, 2018.

(51) Int. Cl.
*H02J 7/00* (2006.01)
*H02M 3/158* (2006.01)
*H02M 1/10* (2006.01)

(52) U.S. Cl.
CPC ............ *H02J 7/008* (2013.01); *H02J 7/0029* (2013.01); *H02M 1/10* (2013.01); *H02M 3/1582* (2013.01); *H02J 7/00304* (2020.01)

(58) Field of Classification Search
CPC ........ H02J 7/008; H02J 7/0029; H02M 3/1582
See application file for complete search history.

(56) References Cited

U.S. PATENT DOCUMENTS

| 800,117 A | 9/1905 | Lemp |
| 7,145,317 B1 | 12/2006 | Shah |
| 7,525,291 B1* | 4/2009 | Ferguson ............... H02J 7/045 320/164 |
| 7,986,137 B2 | 7/2011 | Laur et al. |
| 9,246,348 B2 | 1/2016 | Solie |
| 2012/0139345 A1 | 6/2012 | Ye et al. |
| 2012/0139500 A1 | 6/2012 | Ye et al. |
| 2015/0280473 A1 | 10/2015 | Zhao et al. |
| 2016/0204632 A1 | 7/2016 | Kleine et al. |
| 2016/0246316 A1 | 8/2016 | Lim et al. |
| 2016/0352128 A1 | 12/2016 | Houston et al. |

* cited by examiner

Primary Examiner — Robert Grant
(74) Attorney, Agent, or Firm — Foley & Lardner LLP (57) ABSTRACT

According to certain aspects, the present embodiments are related to systems and methods providing an autonomous adapter pass through mode in a battery charger. For example, when an adapter is connected to the battery charger, but the system is idling, embodiments allow for power from the adapter to be directly coupled to the battery charger output, and main switching to be stopped, thereby dramatically reducing battery charger current consumption. These and other embodiments provide various circuitry and techniques to ensure that the battery is protected in this mode. According to further aspects, the present embodiments provide for the charger itself to autonomously enter and exit the adapter pass through mode, thereby eliminating the need for excessive processing overhead in components external to the battery charger.

20 Claims, 5 Drawing Sheets

AUTONOMOUS ADAPTER PASS THROUGH MODE FOR BUCK-BOOST BATTERY CHARGER

CROSS-REFERENCE TO RELATED APPLICATIONS

The present application claims priority to U.S. Provisional Patent Application No. 62/618,488 filed Jan. 17, 2018, the contents of which are incorporated herein by reference in their entirety.

TECHNICAL FIELD

The present embodiments are directed generally toward battery charging, and more particularly to an autonomous adapter pass through mode for buck-boost chargers.

BACKGROUND

Battery chargers, in particular battery chargers for mobile computing devices, are evolving beyond just being responsible for charging a battery when a power adapter is connected. For example, conventional mobile computing devices such as laptop or notebook computers include a dedicated and typically proprietary plug-in port for a power adapter. When the adapter is plugged in to this dedicated port, the battery charger is responsible for charging the battery using the adapter voltage specified by the manufacturer of the mobile computing device. Relatedly, most conventional mobile computing devices also include standardized interfaces such as Universal Serial Bus (USB) ports. When an external device is plugged into such a USB port, the mobile computing device can exchange data with the external device using the well-known USB protocol. Moreover, the USB standard allows the connected external device (e.g. a smartphone with a micro USB port) to receive power from the mobile computing device via the mobile computing device's USB interface, for example to charge the external device's own battery. Accordingly, conventional battery chargers are further responsible for allowing power to be supplied from the battery to the external device, including from the mobile computing device's own battery when a power adapter is not connected.

Recently, some mobile computing device manufacturers have moved toward replacing the typically separate and proprietary power adapter port with USB ports supporting the newer USB Type C (USB-C) or USB Power Delivery (USB PD) protocols. USB-C supports bi-directional power flow at a much higher level than previous versions of the USB interface (e.g. 5V). Starting from a default 5V voltage, the USB-C port controller is capable of negotiating with the plugged-in device to raise the port voltage to 12V, 20V, or another mutually agreed on voltage, at a mutually agreed current level. The maximum power a USB-C port can deliver is 20V at 5 A current, which is 100 W of power—more than adequate to charge a computer, especially since most 15-inch Ultrabooks require just around 60 W of power.

Conventional battery chargers will need to change when mobile system manufacturers transition to using power adapters that connect to the USB-C port. The battery charger must be capable of charging a battery for a mobile computing device (e.g. an Ultrabook having a 1-, 2-, 3- or 4-cell battery stack) with power from a USB-C adapter having a 5V-20V range. Future battery chargers will also need to accommodate the need to supply power to external electronic devices such as tablets, smartphones, power banks and more that connect to the mobile computing device via the USB-C port. There are many challenges that need to be overcome to accomplish this requirement, such as challenges arising when an adapter is connected to the USB-C port, but the system is idling.

SUMMARY

According to certain aspects, the present embodiments are related to systems and methods providing an autonomous adapter pass through mode in a battery charger. For example, when an adapter is connected to the battery charger, but the system is idling, embodiments allow for power from the adapter to be directly coupled to the battery charger output, and main switching to be stopped, thereby dramatically reducing battery charger current consumption. These and other embodiments provide various circuitry and techniques to ensure that the battery is protected in this mode. According to further aspects, the present embodiments provide for the charger itself to autonomously enter and exit the adapter pass through mode, thereby eliminating the need for excessive processing overhead in components external to the battery charger.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments relate to methods and apparatuses for operating a battery charger in computing systems having certain system load requirements, battery configurations and external device power supply support. According to further aspects, when an adapter is connected to the battery charger, but the system is idling, embodiments allow for power from the adapter to be directly coupled to the battery charger output, and main switching to be stopped, thereby dramatically reducing battery charger current consumption. These and other embodiments provide various circuitry and techniques to ensure that the battery is protected in this mode.

Figure 1:
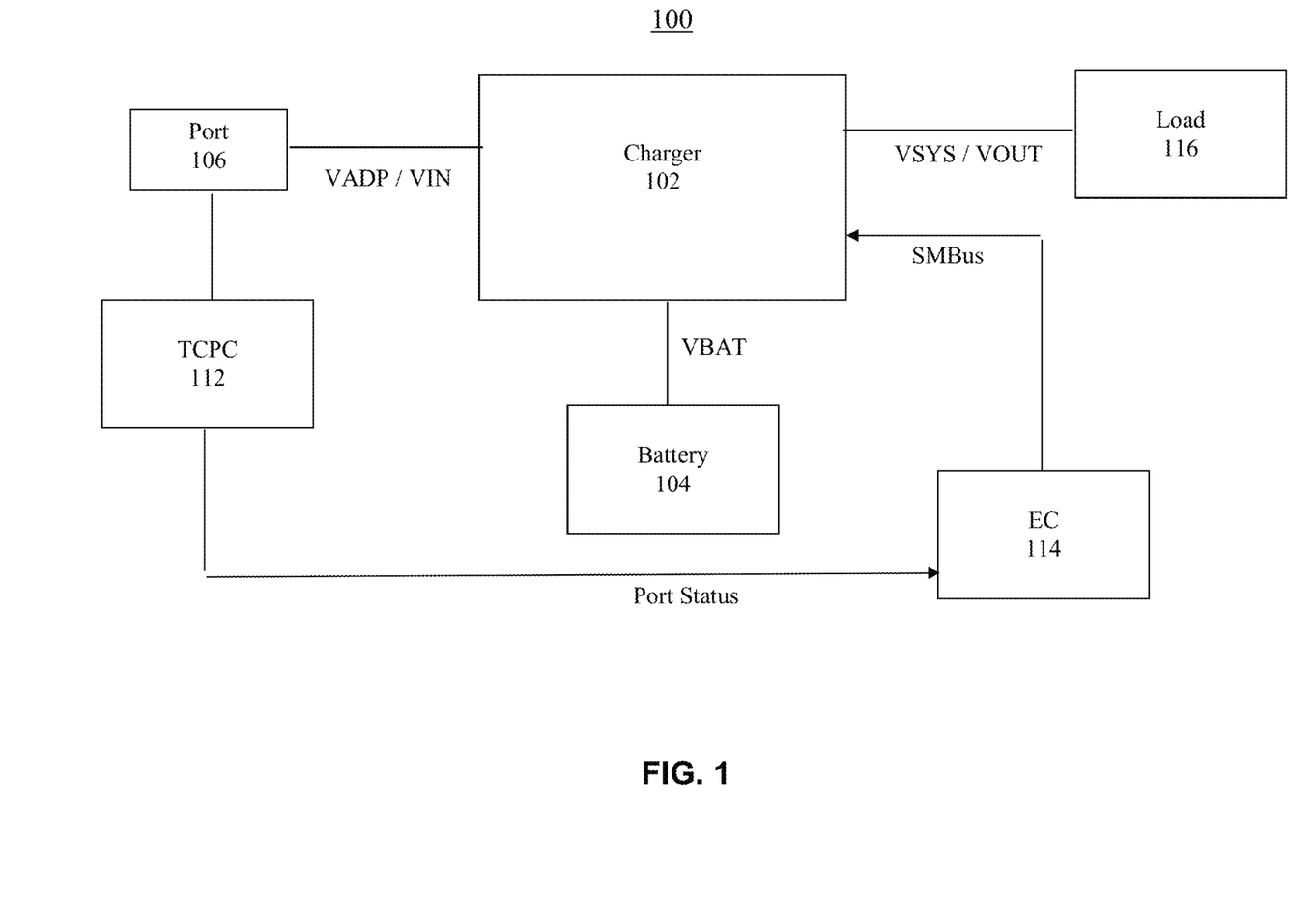
FIG. 1 is a block diagram of an example system including a battery charger with adapter pass-through mode according to the present embodiments.

FIG. 1 is a block diagram illustrating aspects of an example system 100 incorporating the present embodiments. System 100 is a computing device such as a notebook computer (e.g. MacBook, Ultrabook, etc.), laptop computer, pad or tablet computer (iPad, Surface, etc.), etc., a power bank, a USB-C interface platform, or any system using a battery with sensitivity to the supply rail. In these and other embodiments, system 100 includes a load 116, such as a CPU running a conventional operating system such as Windows or Apple OS, and can be an x86 processor from Intel, AMD or other manufacturers, as well as other processors made by Freescale, Qualcomm, DSPs, GPUs, etc. It should be apparent that system 100 can include many other components not shown such as solid state and other disk drives, memories, peripherals, displays, user interface components, etc. According to certain aspects, a system 100 in which the present embodiments can find particularly useful application has operational power needs that can exceed the power limits of technologies such as USB-A, for example over 60 watts. However, the present embodiments are not limited to applications in such systems.

As shown, system 100 includes a battery 104 and a battery charger 102. In embodiments, charger 102 is a buck-boost narrow output voltage DC (NVDC) charger. According to certain general aspects, during normal operation of system 100, when a power adapter is plugged into port 106, battery charger 102 is configured to charge battery 104. Preferably, in addition to charging battery 104, battery charger 102 is further adapted to convert the power from the adapter to a voltage suitable for supplying to components of the system 100, including load 116 (e.g., in a buck mode, a boost mode, or a buck-boost mode as is known in the art). According to certain other general aspects, when a power adapter is not plugged into port 106, battery charger 102 is configured to manage the supply of power to the load 116 and/or a peripheral device connected to port 106 from battery 104 (e.g., in a buck mode, a boost mode, or a buck-boost mode as is known in the art). Further details of battery charger 102 according to the present embodiments will be provided below.

In notebook computer (e.g. Ultrabook) and other embodiments of system 100, battery 104 can be a rechargeable 1S/2S/3S/4S (i.e. 1 cell, 2 cell, 3 cell, or 4 cell stack) Lithium-ion (Li-ion) battery. In these and other embodiments, port 106 can be a Universal Serial Bus (USB) port, such as a USB Type C (USB-C) port or a USB Power Delivery (USB PD) port. Although not shown in FIG. 1, switches between port 106 and charger 102 can also be provided for controllably coupling power from an adapter connected to port 106 to charger 102, or alternatively providing system power to charger 102 and/or port 106. Such switches can also include or be implemented by active devices such as back-to-back FETs.

As further shown, example system 100 in which the present embodiments can find useful applications includes a Type C port controller (TCPC) 112 and an embedded controller (EC) 114. TCPC 112 includes functionality for detecting the type of USB device connected to port 116, controlling switches associated with connecting port 106 to system 100, and for communicating port status to EC 114 (e.g. via an I2C interface). EC 114 is generally responsible for managing power configurations of system 100 (e.g. depending on whether a power adapter is connected or not connected to port 106 as communicated to EC 114 from TCPC 112, etc.), receiving battery status from battery 104, and for communicating battery charging and other operational control information to charger 102 (e.g. via SMbus interface), as will become more apparent from the descriptions below.

According to certain aspects, the present applicant recognizes various problems afflicting conventional battery chargers such as that shown in FIG. 1, and/or adapters incorporating voltage regulators or converters. One problematic scenario is when the charger is plugged into an adapter, but not charging, but idling (i.e. VSYS is up). Certain industry and customer standards such as the EUP Lot7 and Energy Star requirements are toughest at the idle state, requiring less than 300 mW dissipated from the entire system, for example. Meanwhile, in order to pass an adapter voltage of 5V to an output load of 20V, VSYS must be maintained greater than the battery voltage VBAT to prevent battery current from flowing back into the adapter. The battery must also be protected from excessive voltage or discharge. Another problem to consider is thermal issues (although such issues are typically easier to handle). Finally, charger 102 should preferably be able to manage the idle state in an autonomous manner; i.e., EC 114 should not be required to monitor the idle state for customer ease of use.

To address these issues, some conventional products have a pass through mode from adapter to load, but they do not monitor anything to automatically exit this mode. Moreover, these products are typically not battery chargers but buck-boost bi-directional regulators. In other attempts, some conventional buck regulators go into a 100% duty cycle mode and exit based on input/output voltage. Some regulators transition from buck to boost modes with a pass through instead of a buck-boost phase (i.e., regulation voltage is not as tight). None of these attempted solutions are fully satisfactory.

According to certain aspects, the present embodiments address these and other issues by incorporating autonomous adapter pass-through mode functionality in a buck-boost charger. According to further aspects, the present embodiments can monitor key parameters to independently enter and exit the pass-through mode while keeping the system within safe operation. For example, one important object that is satisfied in embodiments is that the battery is always protected.

Figure 2:
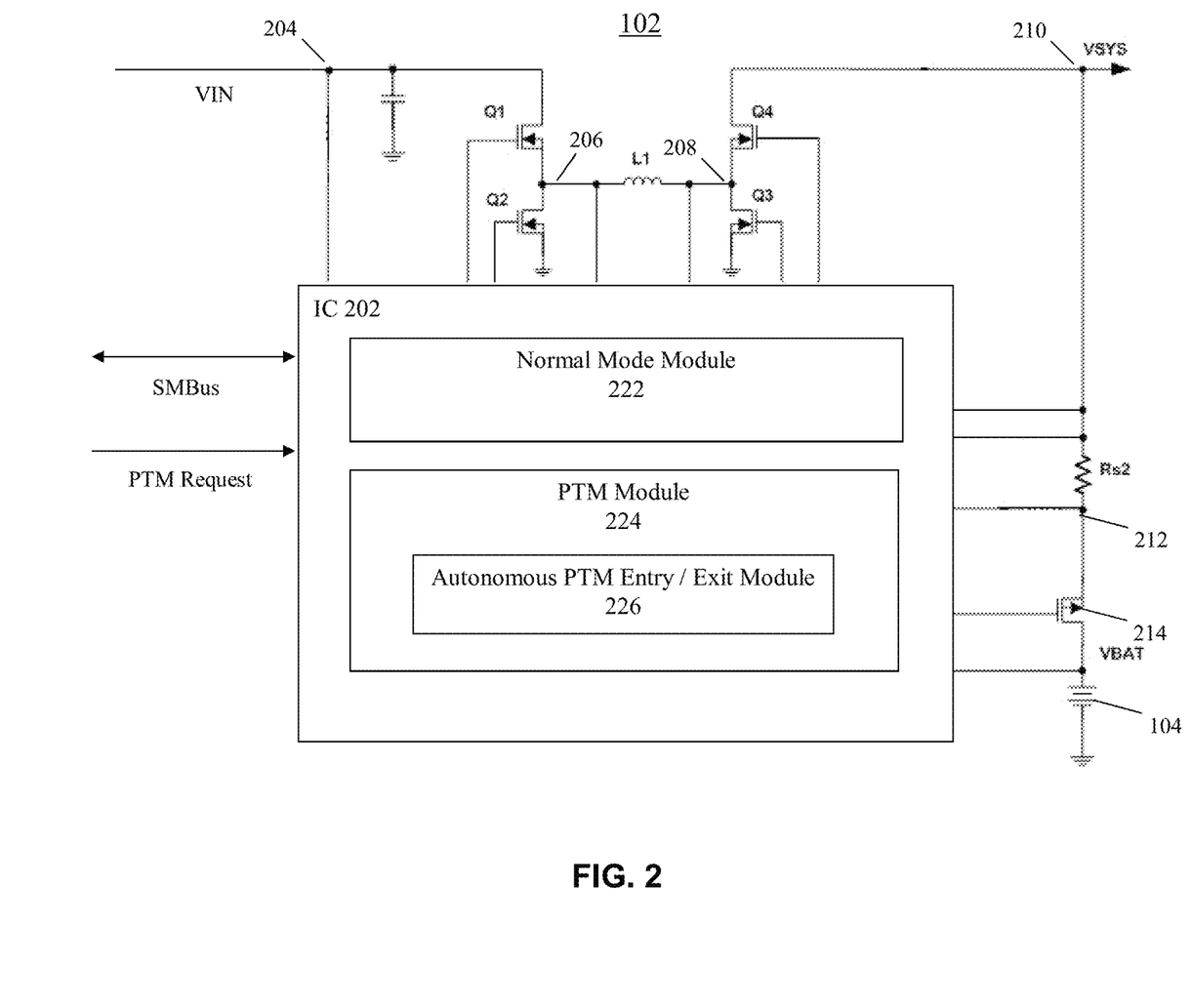
FIG. 2 is a simplified schematic diagram illustrating an example implementation of the battery charger in FIG. 1 with an IC.

FIG. 2 is a schematic diagram of an example implementation of the present embodiments using an integrated circuit 202.

The example charger 102 in these embodiments includes a plurality of power switching transistors including a field-effect transistor (FET) Q1, having its drain coupled to node 204 and its source coupled an intermediate node 206. Another FET Q2 has its drain coupled to node 206 and its source coupled to GND. The charger 102 includes an inductor L1 coupled between node 206 and the node 208. The example charger 102 in these embodiments further includes FET Q4, having its drain coupled to output node 210 and its source coupled an intermediate node 208. Another FET Q3 has its drain coupled to node 208 and its source coupled to GND. As shown, output node 210 provides a system voltage VSYS to a system load 116 such as a CPU (not shown).

Charger 102 in this example further includes a battery current sense resistor Rs2 coupled between output node 210 and an intermediate node 212. Another FET 214 has its source coupled to node 212 and its drain coupled to the rechargeable battery 104 developing the battery voltage VBAT. The gate of FET 212 is coupled to the IC 202 for controlling charge and discharge of the rechargeable battery 104. For example, when the power adapter is not connected, the FET 214 may be turned fully on to provided power to the system load via VSYS. When the power adapter is connected, the FET 214 may be controlled in a linear manner to control charging of the rechargeable battery 104.

The FETs Q1, Q2, Q3, Q4 and 214 are shown implemented using N-channel MOSFETs, although other types of switching devices are contemplated, such as P-channel devices, other similar forms (e.g., FETs, MOS devices, etc.), bipolar junction transistor (BJTs) and the like, insulated-gate bipolar transistors (IGBTs) and the like, etc.

As shown, IC 202 according to the present embodiments includes normal module 222 and a pass-through mode (PTM) module 224 that respectively control operation of transistors Q1, Q2, Q3 and Q4 via output connections to the gates thereof during a normal mode and during a pass-through mode. Modules 222 and 224 are shown separately for ease of illustration but can include common circuitry, including circuitry also shared by modules for controlling other operations of system 100 by IC 202. Additionally and relatedly, although the present descriptions will focus on IC 202 operating when an adapter is connected to port 106, it should be apparent that IC 202 can include additional functionality for operating in other modes, such as when a power adapter is not connected to port 106 and battery 104 is supplying power to the load. The details of such additional functionality and/or circuitry will be omitted here for sake of clarity of the present embodiments.

Module 222 operates FETs Q1, Q2, Q3, Q4 and 214 in a buck mode, a boost mode, or a buck-boost mode to regulate the output voltage VSYS to a narrow DC range for stable system bus voltage. Module 222 can operate when system is provided from the adapter, battery, or a combination of both (e.g., with only the battery 104 connected, with only an adapter connected to port 106, or a combination of both). As such, in embodiments, module 222 is configured to operate in a variety of power and load conditions, such as battery 104 configurations of 2-, 3- or 4-cell Li-ion batteries, input voltages having a range of 3.2 V to 23.4 V, and system output voltages VSYS having a range of 2.4 V to 18.304 V. Various known techniques can be used to implement module 222, and so further details thereof will be omitted here for sake of clarity of the invention.

Module 224 implements PTM operations to regulate the output voltage VSYS when both an adapter and a battery are connected (as well as various other conditions), according to aspects of the present embodiments and as will be described in more detail below. Module 226 determines and manages autonomous PTM mode entry and exit conditions (i.e., the determination and selection of operation of module 224 in place of operation of module 222 is managed entirely within IC 202) as will also be described in more detail below. It should be appreciated that IC 202 can include additional modules for controlling operations according to other system requirements, as well as other components. However, details of such additional modules and components will be omitted here for sake of clarity of the present embodiments.

Figure 3:
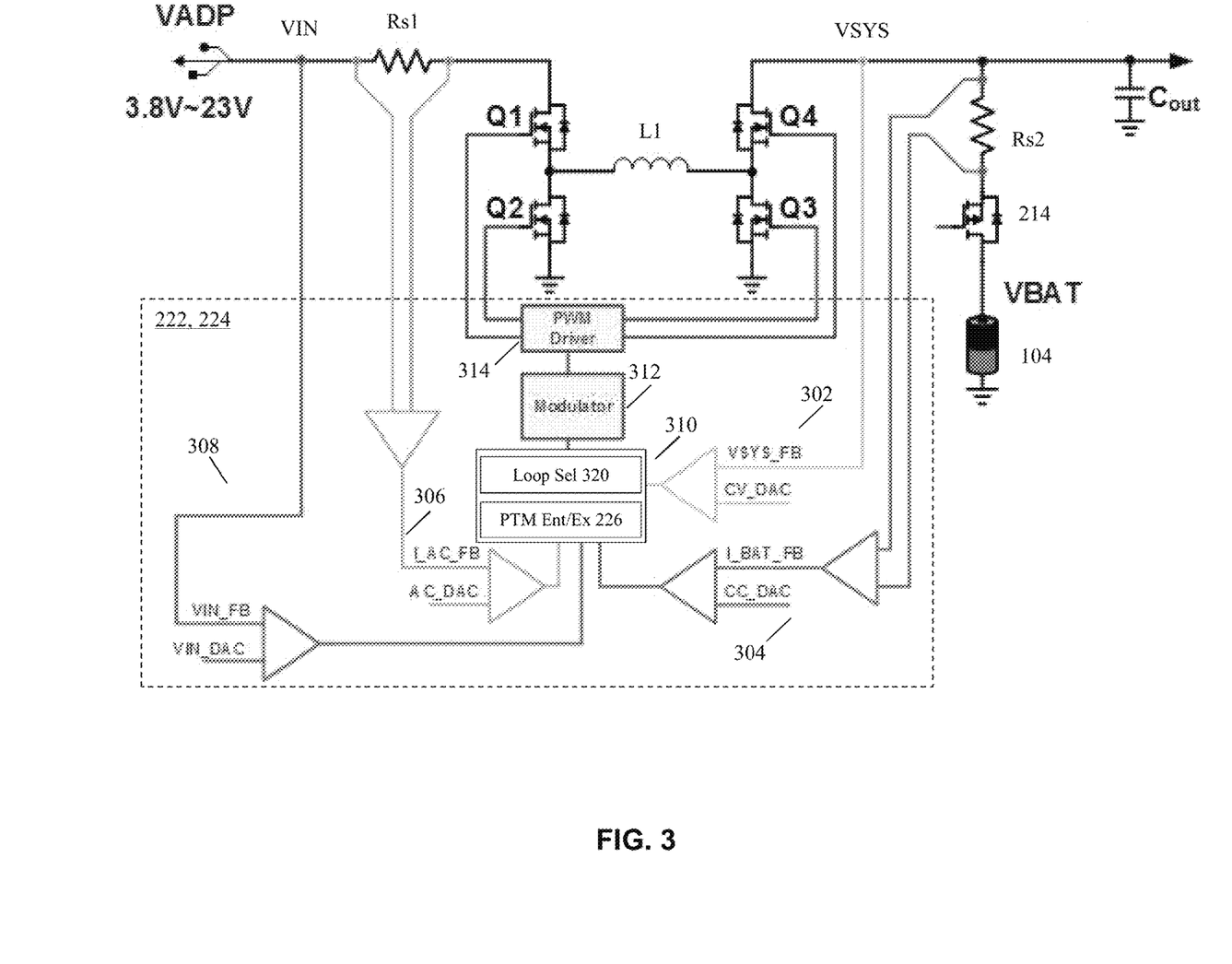
FIG. 3 is a schematic block diagram illustrating an example implementation of PTM circuitry according to the present embodiments.

FIG. 3 is a diagram illustrating an example implementation of Normal mode module 222 and PTM module 224 according to embodiments.

As shown in this example implementation, modules 222 and 224 share much the same circuitry. More particularly, as shown in FIG. 3, for both normal mode and PTM mode, there are four control loops: system voltage loop 302, charge current loop 304, adapter current loop 306 and input voltage loop 308. As further shown, each loop has its own DAC and feedback, which produce corresponding voltages that are provided to an error amplifier.

During normal mode, the amplified error from each loop comprise the difference between the feedback voltage and the DAC voltage. The loop selector 310 receives and compares the four amplified loop errors, and picks the loop with highest error (or the highest error above a minimum threshold error voltage) as the regulation loop in control. Depending on the loop selected by loop selector 320, modulator 312 produces a PWM modulated signal using the loop errors from the selected one of loops 302, 204, 306, 308. PWM driver 312 operates FETs Q1, Q2, Q3, Q4 based on PWM modulated signal from modulator 312.

More particularly, as shown in the example of FIG. 3, when loop 302 is selected by loop selector 320, modulator 312 acts to regulate the output voltage VSYS to a reference voltage specified by CV_DAC. When loop 304 is selected, modulator 312 acts to regulate the voltage corresponding to the battery current across Rs2 to a reference voltage specified by I_BAT_DAC. When loop 306 is selected, modulator 312 acts to regulate the voltage corresponding to the battery current across Rs1 to a reference voltage specified by I_AC_DAC. When loop 308 is selected, modulator 312 acts to regulate the adapter voltage VIN to a reference voltage specified by VIN_DAC.

In general, during PTM, the loop selector 320 is disabled and power from the adapter coupled to port 106 is provided directly to the load 116, which dramatically decreases the amount of power consumed by charger 102. To do this, PWM driver 314 turns on Q1 and Q4 and turns off Q2 and Q3. In embodiments, however, rather than completely stopping the switching of Q1, Q2, Q3 and Q4 as performed in normal mode (e.g. to maintain a regulated voltage VSYS at the output), entry/exit module 226 activates a timer in modulator 312 that, when it expires due to no switching cycles, forces one quick cycle of the gates to Q2 and Q3 so as to refresh the gate voltage.

Likewise, during PTM, entry/exit module 226 receives the outputs from loops 302, 304, 306 and 308 to control PTM mode entry/exit as will be described in more detail below. It should be noted that, although the same DACs can be used, the DAC settings might be different in PTM than in normal mode.

Figure 4:
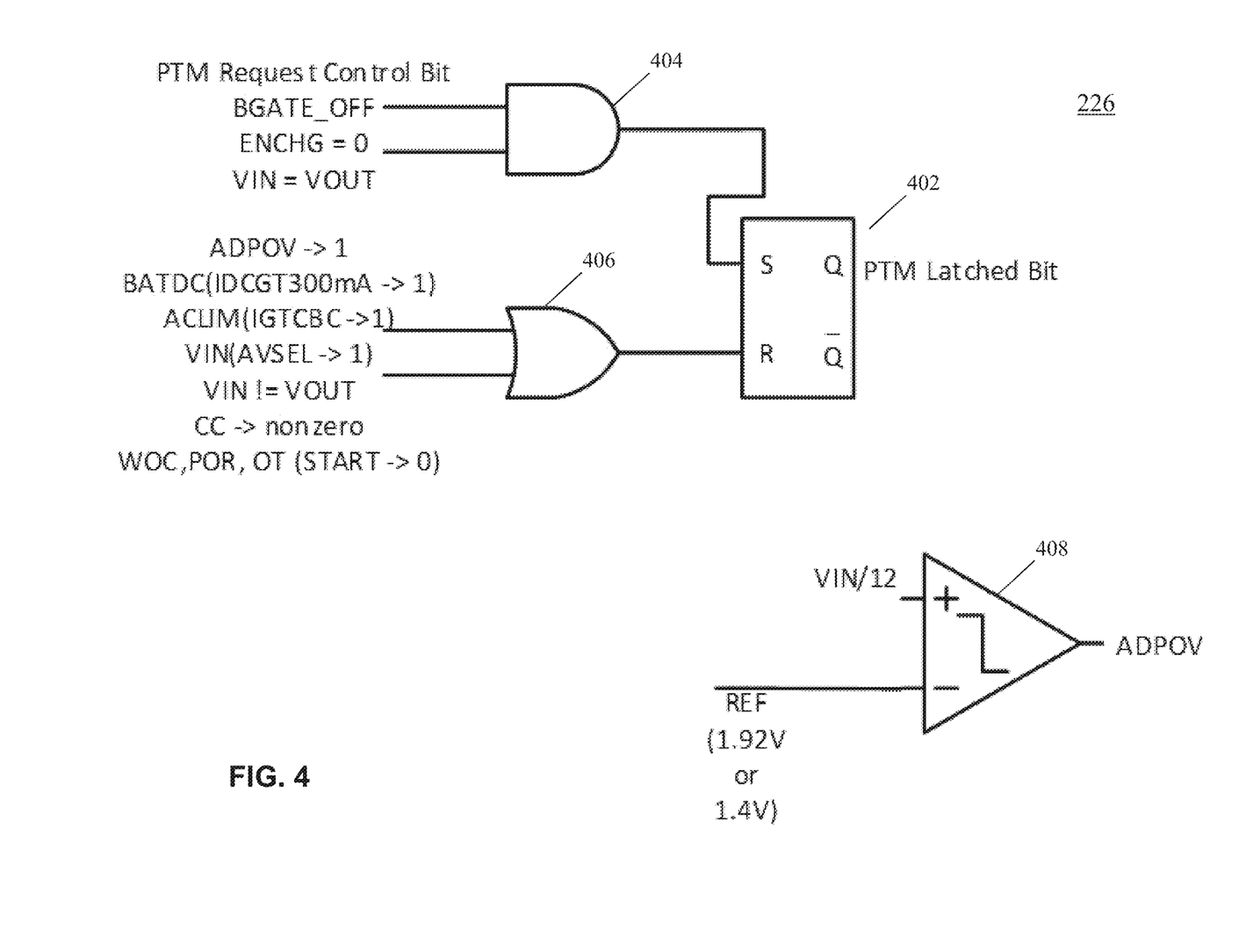
FIG. 4 is a diagram illustrating an example implementation of PTM mode entry/exit determination logic according to the present embodiments.

FIG. 4 is a logic block diagram illustrating an example implementation of autonomous PTM entry/exit module 226 according to embodiments.

As shown in FIG. 4, a flip-flop 402 latches on its Q output indicating entry into PTM mode based on a set input from AND gate 404, and turns off the Q output indicating an exit from PTM mode based on a reset input from OR gate 406.

As further shown in this example, AND gate 404 has four inputs, which all need to be set "on" in order for the output of AND gate 404 to be turned "on", and thus for flip-flop 402 to indicate entry into PTM mode. One input is a PTM Request control bit. In embodiments, this is set to "on" based on an input to charger 102 from EC 114, via an SMBus for example. Another input is BGATE_OFF, which when in the "on" state, indicates that the BFET 214 connected to battery 104 is turned off, thereby protecting the battery during PTM mode. A third input is ENCHG=0, which when "on", indicates that charging of battery 104 by charger 102 is completely disabled. A fourth input is VIN=VOUT, which is set to "on" when the charger 102 determines that the input voltage VADP from the adapter at port 106 is substantially equal to the output voltage VSYS on the output of charger 102. For example, module 224 and/or 226 can include circuitry for controlling modulator 312 to ramp the output voltage VOUT/VSYS toward the value of the input voltage VIN/VADP, and these voltage values can be compared via loops 302 and 308.

Returning to the example of FIG. 4, OR gate 406 has seven inputs, any one of which, when set "on," will cause the output of OR gate 406 to be turned "on", and thus for flip-flop 402 to indicate exit from PTM mode. A first input ADPOV is set to "on" when charger 102 determines that the adapter voltage exceeds an over-voltage value. For example, as shown in FIG. 4, this happens when the input voltage VIN from the adapter (after being divided by 12 in this example) falls below a reference value (either 1.92V or 1.4V in this example) as detected by comparator 408 in module 226. A second input BATDC is set to "on" when charger 102 determines that IDCGT has reached 300 mA. This provides a margin to prevent the battery BFET 214 to be turned back on until VSYS is about equal to VBAT to prevent damage to the BFET. A third input ACLIM is set to on when charger 102 determines that IGTCBC is on, which indicates that the adapter current has reached a limit. A fourth input is set to "on" when the adapter voltage value AVSEL indicates that VIN has fallen below a brownout threshold voltage.

A fifth input to OR gate 406 is when the input voltage VIN has fallen substantially below the output voltage VOUT, which can be detected by comparing VIN to a voltage reference from a DAC, for example. A sixth input is set to "on" when a CC register bit has been set to a non-zero value, indicating that the battery needs to be charged. A seventh input is set to "on" when any one of a number of optional fault conditions are detected by charger 102, such as an output overcurrent fault WOC, a power-on reset fault POR and an over-temperature fault OT.

Figure 5:
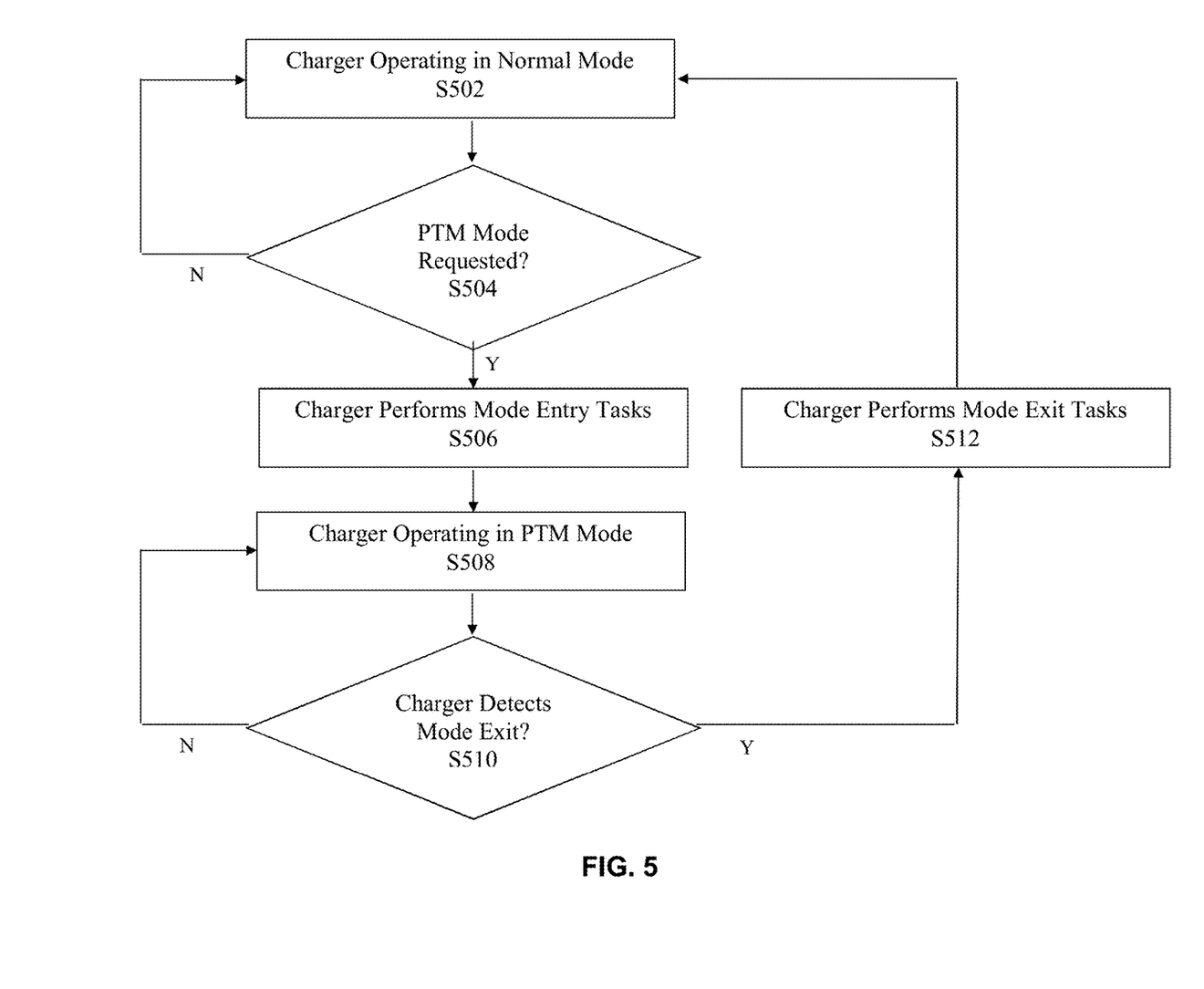
FIG. 5 is a flowchart illustrating an example methodology according to the present embodiments.

FIG. 5 is a flowchart illustrating an example methodology for implementing an autonomous adapter PTM according to embodiments.

For illustration, FIG. 5 shows charger 102 operating in a normal (i.e. non-PTM) mode in block S502. In the example of FIG. 2, this can include normal mode 222 controlling the switching of FETs Q1, Q2, Q3 and Q4 to provide a regulated output to load 116 as described above, including when an adapter is attached to port 106 or not attached, and whether or not battery 104 is being charged.

Block S504 represents a condition where a transition to PTM mode from normal mode is indicated. For example, EC 114 can request that charger 102 transition to PTM mode by signaling that PTM is enabled (e.g. by setting an appropriate bit or sending an appropriate SMBus signal). It should be appreciated that EC 114 (either alone or with interaction with charger 102 while module 222 is still active) can also simultaneously or previously perform a number of PTM mode set-up operations. This can include, for example, performing certain operations to ensure BFET 214 is tuned off and to otherwise protect battery 104. EC 114 can do this by writing certain values to registers via SMBus, such as writing CC=0 A and IDM Disable (e.g. Control1, bit6). EC 114 can also perform certain operations to cause VSYS and/or VIN/VADP to ramp towards the same voltage value. In connection with VSYS, EC 114 can direct charger 102 to regulate VSYS to a certain target voltage (e.g. via SMbus). Additionally or alternatively, in connection with VIN/VADP, EC 114 can cause TCPC 112 to negotiate the same target voltage with the adapter via port 106 and USB-C protocols. In embodiments, EC 114 can also perform certain operations to prevent battery current from flowing back to the adapter, such as by writing the VBAT voltage level to VINREG in charger 102 via SMBus.

In response to the indication that PTM mode is requested in S504, charger 102 autonomously performs certain operations to transition into PTM mode in block S506. Referring to FIG. 4, this block can include module 226 monitoring several conditions before causing flip-flop 402 to latch the PTM status (e.g. Q output is "On") and to thereby activate PTM module 224 and turn off the main switching performed by module 222. Importantly, module 226 monitors VSYS/VOUT to determine when/whether it has reached the level of VADP/VIN. In the example of FIG. 4, several other PTM mode entry conditions are verified, including determining whether the BGATE 214 is turned off, and whether charging has been disabled.

Once latched, PTM mode operation of charger 102 is commenced in block S508. This block includes the operation of PTM module 224, for example as described in connection with FIG. 3.

The present embodiments allow for PTM mode to be exited either autonomously or by an external request, such as from EC 114. The example methodology shown in FIG. 5 illustrates the former. More particularly, as shown in FIG. 5, as described in more detail in connection with FIG. 4, block S510 includes PTM entry/exit module 226 monitoring certain conditions, any one of which can cause PTM mode to be exited. For example, these conditions include an adapter overvoltage condition (ADPOV), a battery discharge condition, an adapter overcurrent condition (ACLIM), an input voltage brownout condition, an input/output voltage mismatch condition, a need for battery charging, and other fault conditions.

As further shown in the example of FIG. 5, when PTM mode exit is detected in block S510, charger 102 can perform a number of additional autonomous exit operations in block S512. For example, in the case of ADPOV, charger 102 can perform a restart operation, turn off the ASGATE, and perform similar operations as in any other ADPOV condition. In the case of battery discharge, since IDM has been disabled, BGATE 214 will still stay OFF. Nevertheless, charger 102 can provide a margin for transients since VADP should be way above the battery voltage VBAT. So charger 102 will not allow BFET 214 to be turned back on until VSYS and VBAT are about the same so as to prevent damage to BFE 214. In any of these or other exit conditions, operation returns to block S502, and main switching resumes, for example as performed by normal mode operating module 222.

As set forth above, although not shown in FIG. 5, PTM mode exit can be controlled by an external entity, such as by EC 114 using SMBus signals to charger 102. This can include performing operations to ensure that PTM module 224 is deactivated and a return to switching as controlled by module 222 is resumed. For example, EC 114 can write SMBus PTM Disable bit and write a non-zero value to CC register via SMBus CC=non-zero (CC register). EC 114 (alone or in interaction with charger 102) further preferably monitors VSYS before BFET 214 is allowed to turn on or else the battery will see an excessive voltage/current spike. This can be handled internal using comparators and ideal diode mode logic. Finally, EC 114 can optionally write various SMBus target values such as IDM, VINREG and ACLIM.

It should be noted that the Autonomous PTM mode of the present embodiments can be set-and-forget by customers and so overhead processing to monitor and protect the system or the battery is not needed. As such, buck-boost chargers with Autonomous PTM could replace all existing buck-boost chargers.

Although not described in detail herein, in an additional or alternative embodiment, for low power needs, a low ohm switch can short the adapter to VSYS. It could even be put into an LDO mode to provide some OCP and OV protection. The same fault conditions could be used to exit this mode.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A battery charger, comprising:
    an input configured to be coupled to a power adapter;
    an output configured to be coupled to a load;
    switching circuitry configured to provide a regulated voltage to the output using power from the input;
    a battery switch configured to allow the switching circuitry to cause the power from the input to further charge a battery; and
    pass-through mode (PTM) circuitry configured to implement PTM operation in response to a PTM request, the PTM circuitry including a flip flop configured to latch and turn off a signal indicating PTM operation, and the PTM operation including controlling the switching circuitry so as to cause power from the input to be passed through the switching circuitry and coupled directly to the output.

2. The battery charger of claim 1, wherein the PTM circuitry is further configured to protect the battery during PTM operation.

3. The battery charger of claim 1, wherein the PTM circuitry is further configured to autonomously manage entry into PTM operation.

4. The battery charger of claim 3, wherein the flip-flop is configured to latch the signal indicating PTM operation in response to the PTM request in logical combination with one or more other signal inputs monitored by the PTM circuitry.

5. The battery charger of claim 4, wherein the one or more other signal inputs includes a signal indicating whether an input voltage at the input is substantially equal to an output voltage at the output.

6. The battery charger of claim 4, wherein the one or more other signal inputs includes a signal indicating whether the battery switch is turned off.

7. The battery charger of claim 1, wherein the PTM circuitry is further configured to autonomously manage exit out of PTM operation.

8. The battery charger of claim 7, wherein the flip-flop is configured to turn off the signal indicating PTM operation in response to a logical combination of one or more signal inputs monitored by the PTM circuitry.

9. The battery charger of claim 8, wherein the logical combination of one or more signal inputs includes any one of an adapter over-voltage signal, a battery over-current signal, an adapter over-current signal and an adapter under-voltage signal being active.

10. The battery charger of claim 1, further comprising a plurality of regulation loops for controlling the switching circuitry during normal mode operation.

11. The battery charger of claim 10, wherein the plurality of regulation loops includes an output voltage regulation loop for causing a voltage at the output to be substantially the same as a reference voltage.

12. The battery charger of claim 10, wherein the plurality of regulation loops includes a battery current regulation loop for causing a battery current to be substantially less than a current indicated by a reference voltage.

13. The battery charger of claim 10, wherein the plurality of regulation loops includes an adapter current regulation loop for causing an input current to be substantially less than a current indicated by a reference voltage.

14. The battery charger of claim 10, wherein the plurality of regulation loops includes an input voltage regulation loop for causing a voltage at the input to be substantially the same as a reference voltage.

15. A method for operating a battery charger having an input configured to be coupled to a power adapter and an output configured to be coupled to a load, the method comprising:
    during a normal mode, using one of a plurality of regulation loops for controlling switching circuitry, operating the switching circuitry so as to provide a regulated voltage to the output using power from the input;
    at specified times during the normal mode, configuring a battery switch so as to allow the switching circuitry to cause the power from the input to further charge a battery; and
    implementing pass-through mode (PTM) operation instead of the normal mode in response to a PTM request, the PTM operation including controlling the switching circuitry so as to cause power from the input to be passed through the switching circuitry and coupled directly to the output,
    wherein the plurality of regulation loops includes one or more of an output voltage regulation loop for causing a voltage at the output to be substantially the same as a reference voltage, a battery current regulation loop for causing a battery current to be substantially less than a current indicated by a reference voltage, an adapter current regulation loop for causing an input current to be substantially less than a current indicated by a reference voltage, and an input voltage regulation loop for causing a voltage at the input to be substantially the same as a reference voltage.

16. The battery method of claim 15, further comprising protecting the battery during PTM operation.

17. The method of claim 15, further comprising, using circuitry inside the battery charger, autonomously managing entry into PTM operation.

18. The method of claim 15, further comprising, using circuitry inside the battery charger, autonomously managing exit out of PTM operation.

19. A battery charger, comprising:
- an input configured to be coupled to a power adapter;
- an output configured to be coupled to a load;
- switching circuitry configured to provide a regulated voltage to the output using power from the input;
- a battery switch configured to allow the switching circuitry to cause the power from the input to further charge a battery; and
- pass-through mode (PTM) circuitry configured to implement PTM operation in response to a PTM request, and configured to autonomously manage entry into PTM operation or autonomously manage exit out of PTM operation, the PTM operation including controlling the switching circuitry so as to cause power from the input to be passed through the switching circuitry and coupled directly to the output,
- wherein the PTM circuitry includes a flip-flop that is configured to latch a signal indicating PTM operation in response to the PTM request in logical combination with one or more other signal inputs monitored by the PTM circuitry, or configured to turn off a signal indicating PTM operation in response to a logical combination of one or more signal inputs monitored by the PTM circuitry.

20. The battery charger of claim 19, further comprising an adapter current regulation loop for causing an input current to be substantially less than a current indicated by a reference voltage.

* * * * *